United States Patent
Bourdrez et al.

(10) Patent No.: US 10,549,775 B2
(45) Date of Patent: Feb. 4, 2020

(54) ESTIMATION OF THE AGEING OF A POWER STEERING

(71) Applicant: JTEKT EUROPE, Irigny (FR)

(72) Inventors: Sébastien Bourdrez, Yzeron (FR); Pascal Moulaire, La Tour de Salvagny (FR); Romaric Pregniard, St Symphorien d'Ozon (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 176 days.

(21) Appl. No.: 15/129,858

(22) PCT Filed: Apr. 7, 2015

(86) PCT No.: PCT/FR2015/050888
§ 371 (c)(1),
(2) Date: Sep. 28, 2016

(87) PCT Pub. No.: WO2015/155455
PCT Pub. Date: Oct. 15, 2015

(65) Prior Publication Data
US 2017/0144698 A1    May 25, 2017

(30) Foreign Application Priority Data

Apr. 10, 2014   (FR) ...................... 14 53197

(51) Int. Cl.
*B62D 5/04*    (2006.01)
*G07C 5/08*    (2006.01)

(52) U.S. Cl.
CPC ......... *B62D 5/0481* (2013.01); *G07C 5/0808* (2013.01)

(58) Field of Classification Search
CPC ....................... B62D 5/0481; G07C 5/0808
(Continued)

(56) References Cited

U.S. PATENT DOCUMENTS 5,076,381 A * 12/1991 Daido ................. B62D 5/0436
                                                 180/446
5,558,350 A *  9/1996 Kimbrough ............. B60D 1/06
                                                 280/426

(Continued)

FOREIGN PATENT DOCUMENTS

EP        1306287 A2    5/2003

OTHER PUBLICATIONS

Jul. 8, 2015 Search Report issued in International Patent Application No. PCT/FR2015/050888.

*Primary Examiner* — Angelina Shudy
(74) *Attorney, Agent, or Firm* — Oliff PLC

(57) ABSTRACT

A method for estimating the ageing of a steering mechanism during which the ageing of the steering mechanism is assessed by calculating a value called «ageing value» according to an ageing function (old, old2, ene) which corresponds to the integral, over time, of an expression which is weighted by a stress indicator ($T_m(u)$, $T_s(u)$) the value of which at each considered instant (u) is representative of the intensity of a stress force ($T_m$, $T_s$), such as the operating force exerted by the assist motor, which is undergone by the steering mechanism at the considered instant.

17 Claims, 1 Drawing Sheet

(58) Field of Classification Search
USPC .......................................................... 701/32.1
See application file for complete search history.

(56) References Cited

U.S. PATENT DOCUMENTS

| | | | | |
|---|---|---|---|---|
| 7,136,732 B2* | 11/2006 | Shimizu | ............... | B62D 5/0463 701/41 |
| 7,222,694 B2* | 5/2007 | Toda | .................... | B62D 5/0463 180/444 |
| 9,776,657 B1* | 10/2017 | Badiru | ................. | B62D 5/0481 |
| 9,789,901 B2* | 10/2017 | Tsubaki | ............... | B62D 5/0463 |
| 9,937,951 B2* | 4/2018 | Pregniard | ............ | B62D 5/0481 |
| 9,950,703 B2* | 4/2018 | Lee | ........................ | B60W 10/20 |
| 9,950,735 B2* | 4/2018 | Barthomeuf | ............ | B60R 25/02 |
| 2003/0079934 A1* | 5/2003 | Kanda | .................. | B62D 5/0481 180/446 |
| 2003/0130775 A1* | 7/2003 | Lu | ....................... | B60T 8/17551 701/36 |
| 2004/0193345 A1* | 9/2004 | Chen | ...................... | B62D 6/003 701/42 |
| 2008/0086251 A1* | 4/2008 | Lu | ......................... | B60T 8/1755 701/70 |
| 2008/0306655 A1* | 12/2008 | Ukai | ...................... | B62D 5/046 701/42 |
| 2009/0088918 A1* | 4/2009 | Takenaka | ............ | B60T 8/17551 701/31.4 |
| 2011/0035110 A1* | 2/2011 | Cassar | .................. | B62D 6/008 701/42 |
| 2011/0257844 A1* | 10/2011 | Cassar | ................. | B62D 15/021 701/41 |
| 2016/0129933 A1* | 5/2016 | Akatsuka | ............. | B62D 5/0463 180/446 |
| 2016/0129935 A1* | 5/2016 | Akatsuka | ............. | B62D 5/0463 180/446 |
| 2017/0023445 A1* | 1/2017 | Bourdrez | ............. | B62D 5/0463 |
| 2017/0131164 A1* | 5/2017 | Bourdrez | ................ | G01L 5/221 |
| 2017/0232997 A1* | 8/2017 | Tsubaki | ............... | B62D 5/0463 180/443 |
| 2018/0134309 A1* | 5/2018 | Moulaire | ............ | B62D 5/0463 |

* cited by examiner

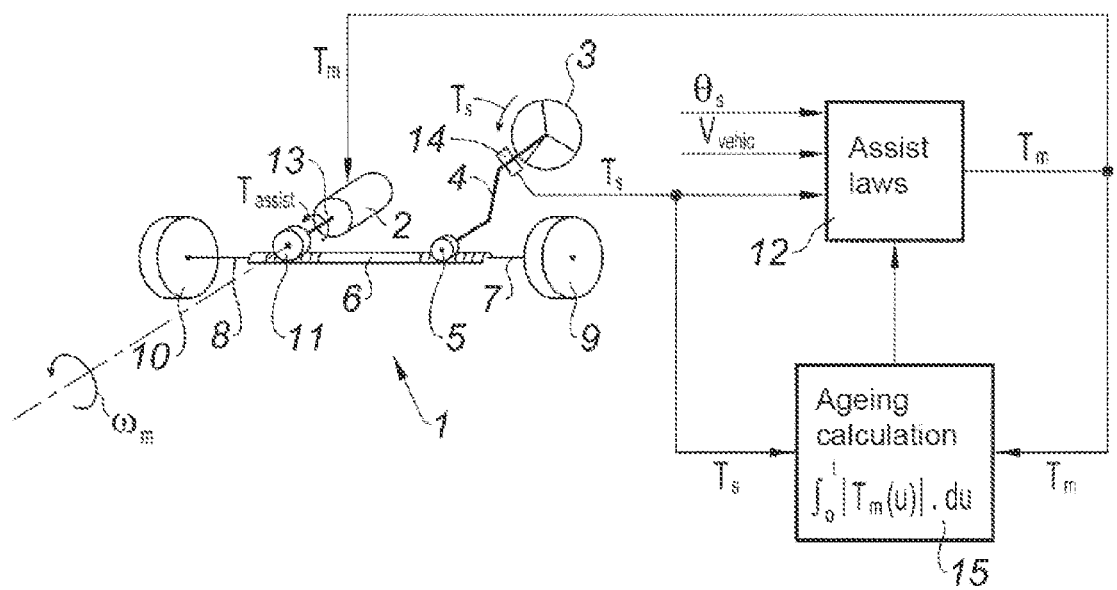

ESTIMATION OF THE AGEING OF A POWER STEERING

The present invention concerns the general technical field of mechanisms equipping vehicles, in particular motor vehicles.

More particularly, the present invention relates to power steering systems, and in particular to electric power steering systems.

In the mechanical field in general, and in the automotive field in particular, it is well known that systems age, deteriorate and finish by being scrapped.

In a general manner, the characteristics and performances of a system therefore depend on the age of said system.

In the case of a power steering mechanism, these characteristics and performances are in particular sensitive to the alteration of some of the materials constitutive of the parts of said mechanism (creeping, hardening or wearing of rubber parts, for example), to the apparition of clearances, to the loss or to the alteration of the lubricants, or still to the modifications of the internal frictions which affect the operating of the mechanism.

Therefore, some initial settings of the power steering may become inappropriate when the system becomes aged.

Thus, for example, if the steering assistance provides for a friction compensation law, intended to improve the comfort and the feeling provided to the driver, and according to which a compensation value is added to the torque setpoint, applied to the assist motor, wherein said compensation value allows substantially compensating the effects of the internal friction, then it would be necessary to calibrate said compensation law by setting said compensation value based on a frictional force measurement that is carried out during a test.

In general, the compensation value is set once for all, which leads to the use of an unchanging compensation law.

Now, the friction which actually affects the steering mechanism is brought to vary, in a significant manner, during the service life of the steering mechanism. In practice, this friction generally tends to decrease with the ageing and wearing of said mechanism.

Consequently, if the compensation law is set from a compensation value measured on a new mechanism, then the compensation will become too significant once the running in is performed. Conversely, if the compensation law is set from a value which derives from a measurement performed on a post-run in steering mechanism, then the compensation will be insufficient on a new vehicle.

Moreover, it will be noted that, unless periodically carrying out inspections and in-depth tests on the vehicle, it is particularly difficult to objectively estimate the ageing of a steering mechanism.

In this respect, it should be in particular noted that the mileage of the vehicle is hardly representative of the ageing of the steering mechanism.

Indeed, if we consider, on the one hand, a first vehicle substantially dedicated to long road travels on highways and, on the other hand, a second driving school vehicle used for parallel parking exercises on a daily basis, then it will be easily understood that, for the same mileage, the wear and the ageing of the steering mechanism will be much more significant in the second case than in the first one.

Consequently, the objects assigned to the invention aim to overcome the aforementioned drawbacks, and to propose a new method allowing estimating, in a simple, effective and reliable way, the degree of ageing of a mechanism, and in particular a steering mechanism.

The objects assigned to the invention are achieved by means of a method for estimating the ageing of a steering mechanism characterized in that the ageing of the steering mechanism is assessed by calculating a value called «ageing value» according to an ageing function which corresponds to the integral, over time, of an expression which is weighted by a stress indicator the value of which at each considered instant is representative of the intensity of a stress force which is undergone by said steering mechanism at said considered instant.

Advantageously, by integrating over time, that is to say over a given duration (integration period), an expression (integrand) which is weighted by, or possibly equal to, a stress indicator representative of the instantaneous mechanical loads undergone by the steering mechanism during said integration period, and more particularly representative of the drive (or position holding) forces exerted by the actuating member(s) of the steering system (steering wheel and/or assist motor) on the drive kinematic chain which links said actuating members to the steered wheels, the method allows assessing the ageing of the steering mechanism over said integration period in a very objective manner.

Indeed, the inventors have discovered that the ageing of the steering mechanism, and in particular the wear and the degree of internal friction affecting the displacement of the movable members of said steering mechanism, are closely related to the accumulation, over time, of the effects of the successive operating stresses of said mechanism (herein the steering operating stresses).

By using, in the ageing function, a stress indicator the instantaneous value of which varies over time, because said value "follows" permanently, substantially in real-time, the degree of the forces (which are in turn variable) which are applied to the steering mechanism in order to operate the latter, are advantageously taken into consideration, in an accurate and complete manner, all of the operating forces which are actually and successively undergone by the steering mechanism over the entire duration of the considered integration period, both in frequency and in intensity.

Furthermore, since the integral used by the ageing function associates (by multiplication) an (elementary) duration to each instantaneous value successively taken by the stress indicator, each successive value of the intensity of the operating force is weighted in practice, upon integration, by the duration during which this force has been exerted.

Thus, by using an integration function, it is advantageously possible to quantify the cumulative effect (both in intensity and over time) of the operating forces undergone by the steering mechanism over the entire considered integration period.

Finally, the method in accordance with the invention therefore advantageously makes it possible to establish a particularly reliable estimate of the effect of ageing by fatigue the steering mechanism is subjected to over the considered integration period, insofar as such an estimate is faithfully and finely representative of the actual use that has been made of said steering mechanism over said integration period, starting from the origin of said integration period until the end thereof.

By initializing the calculation of the ageing function, that is to say by setting the origin of the integration period, to the first road use of the vehicle, and by considering that the end of said integration period corresponds to the present instant at which the calculation of the ageing function is carried out, it is advantageously possible to obtain, thanks to the method in accordance with the invention, an accurate and reliable indicator of the (absolute) global age of the steering mechanism.

Moreover, the implementation of the method is particularly simple and rapid, in particular insofar as the stress indicator may be obtained from data which are already available at any moment in the power steering calculator, such as, typically, the torque setpoint applied to the assist motor and/or the measurement of the steering wheel torque exerted by the driver on the steering wheel.

Other objects, features and advantages of the invention will appear in more detail upon reading the description that follows, as well as with reference to the appended FIG. 1, provided only for an illustrative and non-restrictive purpose, which schematically represents the implementation, according to the invention, of a method for estimating the ageing of a power steering.

The present invention concerns a method for estimating the ageing of a steering mechanism 1, and more particularly a power steering mechanism 1.

As is illustrated in FIG. 1, the steering mechanism 1 advantageously comprises at least one actuating member 2, 3, such as a steering wheel 3 and/or, preferably, an assist motor 2, which actuating member 2, 3 is linked to at least one effector member, such as a steered wheel 9, 10, by at least one drive kinematic chain 4, 5, 6, 7, 8, 11.

By «actuating member» 2, 3, is meant herein a member designed to actively operate the steering, that is to say, which allows applying intentionally a determined (manual and/or motorized) operating force to the steering mechanism 1 in order to control the steering angle of said steering, and more particularly the yaw angular position of one or several effector member(s) 9, 10, such as steered wheels, distant and distinct from said actuating member 2, 3 and movably mounted relative to the chassis of the vehicle, and this so as to be able to control the trajectory of said vehicle.

Although it is not excluded, in absolute terms, to use the method according to the invention to assess the ageing of an exclusively manually-operated steering, it is considered in the following, that, according to a particularly preferred variant, the power steering mechanism 1 is equipped with an assist motor 2, intended to provide an assist force $T_{assist}$ to operate said steering mechanism.

It is possible to consider indifferently any type of assist motor 2, and more particularly any type of two-way operated assist motor.

In particular, the invention may be applied to a rotating assist motor 2, intended to exert a torque-type assist force $T_{assist}$, as well as to a linear assist motor 2, intended to exert a tensile or compressive type assist force $T_{assist}$.

Moreover, said assist motor 2 may be for example hydraulic, or preferably, electric (the use of an electric motor facilitates in particular the setting-up and the implementation of said motor, as well as the generation and the management of the useful signals).

In a particularly preferred manner, the assist motor 2 will be a rotating electric motor, for example of the «brushless» type.

Moreover, the power steering mechanism 1 preferably comprises, in a manner known per se, a steering wheel 3 by which the driver of the vehicle can drive in rotation a steering column 4 which meshes, by means of a steering pinion 5, on a steering rack 6 slidably mounted in a steering casing secured to the chassis of the vehicle.

Each of the ends of the steering rack 6 is preferably linked, via a steering tie rod 7, 8, to a yaw-orientable steering knuckle, on which a steered (and preferably drive) wheel 9, 10 of the vehicle is mounted, so that the displacement of the rack 6 in translation in the casing causes a modification of the steering angle (i.e. the yaw orientation) of said steered wheels 9, 10.

The assist motor 2 (and more particularly the shaft 13 of said assist motor) may be engaged on the steering column 4 itself, for example via a worm wheel and worm screw reducer, or may be engaged directly on the steering rack 6, by a ball screw type drive mechanism or via a motor pinion 11 distinct from the pinion 5 of the steering column (thereby forming a steering mechanism called «dual-pinion» steering mechanism, such as the one schematized in FIG. 1).

As example, in the dual-pinion variant illustrated in FIG. 1, it is possible to consider that the «manual» drive kinematic chain which links the steering wheel 3 to the wheels 9, 10 includes the steering column 4, the steering pinion 5, the rack 6, and the tie rods 7, 8, whereas the «motorized» drive kinematic chain which links the assist motor 2 to these same wheels includes the motor pinion 11, the rack 6, and the tie rods 7, 8.

The force setpoint (or, more preferably, the torque setpoint) $T_m$ which is applied to the assist motor 2 so that said motor assists the driver in operating the steering mechanism 1 depends on predetermined assist laws, stored in a non-volatile memory of a calculator (herein an assist laws application module 12), said assist laws being capable of adjusting the force setpoint $T_m$ based on various parameters such as the steering wheel torque $T_s$ exerted by the driver on the steering wheel 3, the (longitudinal) speed $V_{vehic}$ of the vehicle, the angular position $\theta_s$ of the steering wheel 3, etc.

According to the invention, the ageing of the steering mechanism is assessed by calculating a value called «ageing value» according to an ageing function (noted «old», «old2» or «ene» in the following) which corresponds to the integral, over time (and more particularly over the integration period equal to the interval [0, t]), of an expression which is weighted by a stress indicator $T_m(u)$, $T_s(u)$ the value of which at each considered instant $\underline{u}$ is representative of the intensity (in absolute value) of a stress force $T_m$, $T_s$ which is undergone by said steering mechanism 1 at said considered instant $\underline{u}$.

More particularly, it is therefore possible to assess the ageing of the steering mechanism 1 by calculating an ageing function old, old2, ene which corresponds to the integral, over time, of an expression which is weighted by a stress indicator the value of which at each considered instant is representative of the stress level (degree) of the drive kinematic chain, and more particularly of the steering rack 6, at said considered instant.

Advantageously, as has been mentioned hereinabove, the original use, as an ageing indicator (and therefore as an age indicator) of a mechanism 1, of the time integral of an expression containing a factor (stress indicator) representative of the intensity of the instantaneous forces exerted on said steering mechanism allows a reliable and realistic assessment of ageing which is related to the mechanical fatigue undergone by said mechanism.

Advantageously, the use of an integral in particular allows cumulating (summing) over time the contributions to ageing of all the forces (of all the different intensities of the considered force) succeeding over time, which allows obtaining a faithful ageing assessment that is consistent with the actual history of the loads which are applied to the steering mechanism 1 (herein, the history of the operating force(s)).

As is illustrated in FIG. 1, the integral calculation step (a), according to the method in accordance with the invention, may be carried out by an ageing calculation module 15.

Advantageously, the possibility to refresh the calculation of the integral at any instant $t$ (preferably starting from a fixed, invariable origin $0$), allows updating the ageing assessment at any moment, and therefore knowing, accurately and permanently, the exact age of the mechanism 1.

Hence, herein again, the method allows accurately quantifying the age of the mechanism 1, and accordingly deciding on automatic actions, based on this estimated age value.

For example, it will be possible to provide for corrective actions on the assist laws or warning actions intended to inform the driver of the necessity to proceed to maintenance of the steering system or other parts of the running gear of the vehicle.

Depending on the configuration of the steering mechanism 1, and more particularly depending on the configuration of the actuating members 2, 3, the stress indicator $T_m(u)$, $T_s(u)$ may be a measurement or an estimate of a torque (in particular a torsion torque intended to drive the considered part in rotation about its axis) or, in an equivalent manner, a measurement or an assessment of a linear force (for example a longitudinal tensile/compressive force exerted on the steering rack 6).

Preferably, the stress indicator $T_m(u)$, $T_s(u)$ is representative of the intensity of the operating force $T_m$, $T_s$ which is exerted by an actuating member 2, 3, or, respectively, the intensity (if appropriate, the cumulative intensity) of the operating forces $T_m$, $T_s$ which are simultaneously exerted by several of the actuating members 2, 3 on the drive kinematic chain.

In this respect, the stress indicator $T_m(u)$, $T_s(u)$ may preferably be chosen among: the torque setpoint $T_m$ which is applied to the assist motor 2, the measurement of the assist torque $T_{assist}$ which is actually delivered by the assist motor 2, or the measurement of the steering wheel torque $T_s$ which is exerted by the driver on the steering wheel 3.

Advantageously, these signals are, in the first place, representative of the mechanical loads undergone by the steering mechanism 1, when one comes to modify the steering angle or when said mechanism is retained in the desired steering angle, against for example the external stresses exerted on the tires of the wheels 9, 10.

Furthermore, these signals are easily accessible and usable, as they are commonly already available in the calculator which manages the power steering.

Thus, for example, the value of the motor torque setpoint $T_m$ may be obtained at the output of the assist laws application module 12, as is illustrated in FIG. 1.

The measurement of the (electromagnetic) assist torque $T_{assist}$ may be provided by an adequate torque sensor, preferably integrated into the controller of the assist motor 2.

The measurement of the steering wheel torque $T_s$ may be obtained by an appropriate steering wheel torque sensor 14, such as a magnetic torque sensor measuring the elastic deformations of a torsion bar placed between the steering wheel 3 and the steering column 4.

In practice, it will still be highlighted that, in most life situations considered for the vehicle, the value of the setpoint $T_m$ applied to the assist motor 2 and the value of the assist force $T_{assist}$ which is actually provided by said assist motor 2 (in application of the aforementioned setpoint), are extremely close, and even equal, to each other, so that these two signals $T_m$, $T_{assist}$ may be used in an equivalent manner in the context of the invention.

For the convenience of the description, it is therefore possible to refer indifferently to either one of these two signals in the following, or to assimilate one signal with the other, in particular for their use as a stress indicator.

According to a possible implementation which simplifies and accelerates the measurements and the calculations, the integrand of the chosen ageing function, that is to say the expression which is integrated over time at the integral ageing calculation step (a), may be restricted to the sole stress indicator itself $T_m(u)$, $T_s(u)$.

Preferably, as the steering mechanism 1 comprises an assist motor 2, it is possible to calculate an ageing value according to a first ageing function «old» representative of the ageing related to the action of the assist motor 2, said first ageing function being given by:

$$\text{old }(t) = \int_0^t |T_m(u)|\,du,$$

where $T_m(u)$ represents the motor torque setpoint $T_m$ applied to the assist motor 2 or, respectively, the measurement of the assist torque $T_{assist}$ delivered by the assist motor, at the instant $u$.

This first ageing function «old», the integrand of which is restricted to a value (variable over time) representative of the torque $T_{assist}$, $T_m$ provided by the assist motor 2, advantageously allows taking into consideration, in the ageing calculation, the contribution of the motorized operating force, exerted by the assist motor 2 on the steering mechanism 1.

In this respect, it will be noted that, since the assist force $T_{assist}$, $T_m$ provided by the motor 2 is generally considerably higher than the manual force $T_s$ exerted by the driver on the steering wheel 3, this «motorized» assist force represents, in practice, the main source of ageing by fatigue of the mechanism 1.

Hence, the proposed first ageing function «old» may be, in itself, significantly representative of the actual ageing of the steering mechanism 1.

As an alternative or a complement to this consideration of the contribution of the motorized (assist) operating force $T_{assist}$, $T_m$ to ageing, it is possible to take into consideration the contribution to ageing that is specific to the manual operating force $T_s$.

In this respect, as the steering mechanism comprises a steering wheel 3, it is possible to calculate an ageing value according to a second ageing function «old2» representative of the ageing related to the action of the steering wheel 3, said second ageing function being given by:

$$\text{old }2(t) = \int_0^t |T_s(u)|\,du,$$

where $T_s(u)$ represents the measurement of the steering wheel torque $T_s$ which is exerted by the driver on the steering wheel 3, at the instant $u$.

This second ageing function, the integrand of which is herein restricted to the stress indicator representative of the (sole) steering wheel torque $T_s$, advantageously allows taking into consideration the contribution of the manual operating forces to the ageing process, in particular in order to assess the ageing of the portions of the steering mechanism which are not subjected to the action of the assist motor 2.

In the absence of steering assistance, and even in the absence of an assist motor 2, this second ageing function «old2» may be in itself representative of the ageing of the mechanism 1.

In the case of a steering mechanism 1 provided with an actively-used assist motor 2, this second ageing function «old2» may be used as a complement to the first ageing function «old», so that the ageing calculation is more accurate by taking into consideration both the contribution of the motorized forces (by the first function «old») and the contribution of the manual forces (by the second function «old2»).

In this respect, it will be noted that, in practice, since the respective contributions (to ageing of the steering mechanism 1) of the motorized forces and manual forces may be very different, the first ageing function «old» and the second ageing function «old2» will preferably be calculated separately (independently) from each other, so as to be able to monitor, in parallel, the independent evolution of each of these two ageing functions.

Nonetheless, in another assumption where it would be after all considered to calculate the sum of the respective contributions of the first and second ageing functions «old» and «old2» in order to directly assess a global ageing, it will be noted that, in absolute terms, because of the distributive property of the integral, it would be indifferently possible to either sum the first and second ageing functions (old+old2) after having calculated them separately from each other, or directly perform the integral calculation of an integrand using a stress indicator which is (already) equal to the sum $(T_s+T_m)$ of the steering wheel torque and the assist torque delivered by the motor.

According to a possible implementation of the method, an ageing value is calculated according to an ageing function the integrand of which contains the product (and preferably is exclusively restricted to the product), on the one hand, of a stress indicator $T_m(u)$, $T_s(u)$ representative of the intensity of the force, and more particularly representative of the intensity of the torque, exerted by an actuating member 2, 3 of the steering mechanism 1, such as the steering wheel 3 and/or the assist motor 2, and on the other hand, of the speed of displacement of said actuating member 2, 3 (in the reference frame attached to the vehicle and to the steering casing), and more particularly the speed of rotation $\omega_m$ of said actuating member 2, 3.

Advantageously, such a product force x (linear) speed of displacement, and more particularly torque x (angular) speed of rotation, corresponds to the instantaneous power brought by the actuating member 2, 3 to the steering mechanism 1.

In this manner, the integral, over time, of such an expression allows assessing the mechanical energy brought to said mechanism 1 over the entire duration of the integration period.

Hence, the invention advantageously allows calculating the ageing while taking into account not only of the intensity of the forces applied to the steering mechanism and their accumulation over time, but also of the dynamic situation according to which these forces are administered to the steering mechanism 1.

Hence, the estimation of the ageing may be more accurate, because in practice, ageing also depends on this dynamic.

Indeed, as example, it will be understood that a motor torque applied on a blocked steering mechanism 1 (for example because said mechanism has reached its stroke limit or because one of the wheels 9, 10 abuts against an obstacle) will tend to hit or force said mechanism 1 and will not therefore have the same impact in terms of deformation and fatigue as if this same torque were applied on a moving mechanism 1 during a free steering operation.

Preferably, if the considered actuating member is the assist motor 2, it would be more particularly possible to calculate an ageing value according to a third ageing function (ene) representative of the energy delivered by the assist motor 2, said third ageing function being given by:

$$ene\ (t) = \int_0^t |T_m(u) \cdot \omega_m(u)| \, du,$$

where $T_m(u)$ represents the motor torque setpoint or the measurement of the assist torque delivered by the assist motor 2 at the instant $\underline{u}$, and $\omega_m(u)$ represents the speed of rotation of the shaft 13 of the assist motor 2 at this same instant $\underline{u}$.

Thus, it would be advantageously possible to calculate the time integral of the instantaneous power delivered by the assist motor 2, that is to say the amount of energy which would have been "injected" by the assist motor in the steering mechanism 1 and transmitted (and dissipated in part) by the drive kinematic chain, over the entire considered integration period, and more particularly from the first start-up of said assist motor 2.

In a particularly preferred manner, and this regardless of the considered ageing function or the considered combination of ageing functions, the absolute ageing of the steering mechanism is assessed by performing the integral calculation of the ageing function over a global time period [0, t] the origin $\underline{0}$ of which corresponds to the first entry into service of the steering mechanism 1 or, more particularly, to the first road use of the vehicle equipped with said steering mechanism.

Thus, it is possible to assess the total (absolute) age of the steering mechanism, from the absolute time zero associated to the first entry into service of the mechanism 1 until the present instant $\underline{t}$ at which the integral calculation is ended.

Advantageously, the result of the calculation of the ageing function (ageing value) will be stored in a non-volatile memory, so that the ageing calculation could be preserved during the stop phases of the vehicle and resumed cumulatively (without being reset) at each new start-up of the vehicle.

The invention also concerns, more generally, a method for managing a power steering comprising determining the age of the mechanism 1 of said power steering by means of a method for estimating the ageing according to any one of the features described in the foregoing, and afterwards adapting at least one assist law and/or friction model used by an assist law of said power steering, based on this determined age.

In other words, the ageing value will be advantageously used as a parameter that modifies one or several assist law(s), and/or a friction model allowing assessing the internal friction which resists the operations of the steering, and this in order to be able to dynamically adjust, over time, the management of the power steering depending on the actual age of the mechanism 1.

In particular, it will be thus possible to progressively reduce the compensation of the frictions with the increasing ageing of the mechanism 1.

Of course, the number and the nature of the assist laws sensitive to ageing, which may be modified voluntarily, based on the ageing value which is returned by one or several ageing function(s) according to the invention, are in no way limited.

Thus, for example, as a complement or an alternative to the adaptation of the above-mentioned assist laws, it is also possible to provide for an adaptation, based on the age of the steering mechanism determined according to the invention, of at least one elasticity chart which characterizes (for example in the form of a curve or a mapping) the stiffness of a movable member of the steering mechanism 1, such as the steering wheel 3, the rack 6, the shaft 13 of the assist motor 2, the steering column 4, and the corresponding pinions 5, 11, and/or the stiffness of the kinematic linkage between two movable members of the steering mechanism, for example the linkage between the steering column 4 and the rack 6, the steering pinion 5, or the linkage between the shaft 13 of the assist motor and the rack 6, via the motor pinion 11.

By «stiffness», is meant herein, in the sense of the characteristic of a spring-type element, the ratio between, on the one hand, the variation of the force, or the torque, undergone by the considered movable member or transmitted by the considered linkage and, on the other hand, the corresponding elastic deformation of said member, respectively said linkage.

Advantageously, an elasticity chart will allow taking into consideration the elastic deformations, under stresses, of the movable members and/or kinematic linkages formed between said movable members, when the position of a movable member of the steering mechanism 1 will be calculated from the knowledge (measurement or estimate) of the position of another movable member belonging to the same kinematic chain, and more generally to the same steering mechanism 1.

Thus, it will be possible, for example, to estimate with a high accuracy, based on the stress condition exerted on the steering mechanism 1, and in particular based on the torque exerted by the assist motor 2 and/or the torque exerted manually by the driver on the steering wheel 3, the position of the rack 6 and/or the position of the steering wheel 3 from the measured absolute angular position of the shaft 13 of the assist motor 2, when knowing the gear ratios (the transmission ratios) of the pinions 5, 11 on the rack 6, as well as the elastic deformations induced respectively at the successive linkages between the shaft 13 of the motor and the rack 6, then between the rack 6 and the steering column 4.

More particularly, if a linkage which couples a first movable member to a second movable member is considered, the position of the second movable member may be calculated by multiplying the position of the first movable member by the (theoretical and ideal) transmission ratio of said linkage, then by adding the deviation which corresponds to the elastic deformation of said linkage, which deviation is calculated, on the one hand, from the measured or estimated force (typically the motor torque), which is transmitted by said linkage and, on the other hand, from the stiffness of said linkage, provided by the elasticity chart.

It will be noted that, for convenience, all positions may be expressed in the form of an equivalent angular position, with reference to the angular position of the shaft 13 of the motor and/or to the angular position of the steering wheel 3.

Advantageously, the adaptation, that is to say the update, of the elasticity chart(s) depending on the age of the steering mechanism 1 allows preserving, throughout the service life of the vehicle, a good accuracy upon the calculation of the position of a movable member, in particular because the wear effects are taken into account, amongst which the progressive apparition of clearances and the reduction of frictions in the linkages, which modify the elastic behavior, and more particularly the stiffness, of the considered linkage (or of the considered section of the kinematic chain), and consequently the layout of the relevant elasticity chart.

Moreover, the invention also concerns, as such, an ageing assessment module 15, formed by an electronic circuit, an electronic board, a calculator (computer), a programmable logic controller, or any other equivalent device, and which may present a physical control structure, defined by the wiring arrangement of its electronic components and/or, preferably, a virtual control structure, defined by computer programming, so as to be able to implement a method in accordance with the invention.

The invention also concerns, as such, a data medium readable by a computer and containing code elements of a computer program ensuring the execution of a method according to any one of the features described in the foregoing when said medium is read by a computer.

Finally, the invention concerns a motor vehicle, in particular with steered, possibly drive wheels, equipped with a power steering system driven by a control module (such as a calculator) designed to implement a method according to any one of the aforementioned features.

Of course, the invention is in no way limited to the sole variants described in the foregoing, those skilled in the art being in particular capable of freely isolating or combining together either one of the aforementioned features, or substituting them with equivalents.

In particular, it is perfectly conceivable to generalize the principle of the ageing calculation by integration of the stresses over time to any other mechanism, and in particular to any motor vehicle mechanism, comprising movable members driven by manual or motorized actuating members of any kind.

The invention claimed is:

1. A method for managing a power steering comprising a steering mechanism, the method comprising:
   determining an age of the steering mechanism by estimating ageing of the steering mechanism by calculating an ageing value according to an ageing function (old, old2, ene) which corresponds to an integral, over time, of an expression which is weighted by a stress indicator ($T_m(u)$, $T_s(u)$), the stress indicator having a value at each considered instant in time (u) representative of an intensity of a stress force ($T_m$, $T_s$) undergone by the steering mechanism at each considered instant in time, and
   correcting, based on the determined age, initial settings of at least one of (i) an assist law of the power steering, (ii) a friction model used by the assist law of the power steering, and (iii) at least one elasticity chart which characterizes one or both of a stiffness of a movable member of the steering mechanism and a stiffness of a kinematic linkage between two movable members of the steering mechanism.

2. The method according to claim 1, further comprising modifying, based on the ageing value as a parameter, a friction model for assessing internal friction that resists steering operations of the power steering, so as to dynamically adjust, over time, based on the age of the steering mechanism, a friction compensation.

3. The method of claim 2 wherein modifying a friction model so as to dynamically adjust a friction compensation over time comprises reducing the friction compensation with an increasing ageing of the steering mechanism.

4. The method according to claim 1, wherein, as the steering mechanism comprises at least one actuating member, which is linked to at least one effector member, by at least one drive kinematic chain, the stress indicator ($T_m(u)$, $T_s(u)$) is representative of an intensity of at least one operating force ($T_m$, $T_s$) which is exerted by the at least one actuating member when the at least one actuating member includes a single actuating member, or the intensity of the at least one operating force simultaneously exerted respectively by several actuating members, on respective drive kinematic chains when the at least one actuating member includes the several actuating members.

5. The method according to claim 4, wherein, the at least one actuating member is at least one of a steering wheel and an assist motor.

6. The method according to claim 4, wherein, the at least one effector member is a wheel steered by the steering mechanism.

7. The method according to claim 4, wherein the stress indicator is selected from the group consisting of a motor torque setpoint ($T_m$) which is applied to an assist motor, a measurement of an assist torque ($T_{assist}$) which is actually delivered by the assist motor, and a measurement of a steering wheel torque ($T_s$) which is exerted by a driver on a steering wheel.

8. The method according to claim 1, wherein, as the steering mechanism comprises an assist motor, the ageing value is calculated according to a first ageing function (old) representative of the ageing related to an action of the assist motor, the first ageing function being given by:

$$\text{old }(t) = \int_0^t |T_m(u)|\, du,$$

where $T_m(u)$ represents a motor torque setpoint applied to the assist motor, or a measurement of an assist torque delivered by the assist motor, at the instant in time u.

9. The method according to claim 1, wherein, as the steering mechanism comprises a steering wheel, the ageing value is calculated according to a second ageing function (old2) representative of the ageing related to an action of the steering wheel, the ageing function being given by:

$$\text{old }2(t) = \int_0^t |T_s(u)|\, du,$$

where $T_s(u)$ represents a measurement of a steering wheel torque which is exerted by a driver on the steering wheel, at the instant in time u.

10. The method according to claim 1, wherein, the ageing value is calculated according to an ageing function an integrand of which contains a product of (i) the stress indicator ($T_m(u)$, $T_s(u)$) representative of an intensity of a force, exerted by an actuating member of the steering mechanism, and (ii) a speed of displacement of the actuating member of the steering mechanism.

11. The method according to claim 10, wherein the actuating member of the steering mechanism is an assist motor, so that the ageing value is calculated according to a third ageing function (ene) representative of an energy delivered by the assist motor, the third ageing function being given by:

$$ene\ (t) = \int_0^t |T_m(u) \cdot \omega_m(u)|\, du,$$

where $T_m(u)$ represents a motor torque setpoint or a measurement of an assist torque delivered by the assist motor at the instant in time u, and $\omega_m(u)$ represents a speed of rotation of a shaft of the assist motor at the instant in time u.

12. The method according to claim 10, wherein the stress indicator ($T_m(u)$, $T_s(u)$) is representative of an intensity of a torque exerted by the actuating member of the steering mechanism.

13. The method according to claim 10, wherein the actuating member of the steering mechanism is at least one of a steering wheel and an assist motor.

14. The method according to claim 10, wherein the speed of displacement of the actuating member is the speed of rotation ($\omega_m$) of the actuating member of the steering mechanism.

15. The method according to claim 1, further comprising assessing an absolute ageing of the steering mechanism, by calculating the ageing function over a global time period [0, t] an origin of which corresponds to a first entry into service of the steering mechanism or, to a first road use of a vehicle equipped with the steering mechanism.

16. A motor vehicle equipped with a power steering system driven by a control module designed to implement the method according to claim 1.

17. A non-transitory data medium readable by a computer and containing a computer program, the program comprising instructions for the computer to execute the method according to claim 1, when the non-transitory data medium is read by the computer.

* * * * *